United States Patent
Akaike

[19]

[11] Patent Number: 6,105,258
[45] Date of Patent: *Aug. 22, 2000

[54] PORTABLE TRIMMER EQUIPPED WITH BRAKE DEVICE FOR ROTATABLE CUTTER

[75] Inventor: Junichi Akaike, Chofu, Japan

[73] Assignee: Kioritz Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/114,062

[22] Filed: Jul. 13, 1998

[30] Foreign Application Priority Data

Jul. 22, 1997 [JP] Japan .................................. 9-195568

[51] Int. Cl.[7] .................................................. B27G 19/02
[52] U.S. Cl. ........................................... 30/276; 30/272.1
[58] Field of Search ................................ 83/169, DIG. 1, 83/526, 471, 471.2, 472, 475, 476, 651; 30/162, 276; 299/39; 192/13, 17; 187/110; 188/74, 82.1, 82.3, 82.6, 82.7

[56] References Cited

U.S. PATENT DOCUMENTS

| | | | |
|---|---|---|---|
| 1,231,601 | 7/1917 | Harris | 188/74 |
| 1,428,932 | 9/1922 | Bayer | 188/74 |
| 1,522,299 | 1/1925 | Hampton | 188/74 |
| 2,188,648 | 1/1940 | Bouvier et al. | 188/74 |
| 2,939,691 | 6/1960 | Lewis | 299/39 |
| 3,052,421 | 9/1962 | Fischer | 188/74 |
| 3,074,516 | 1/1963 | Wood | 188/74 |
| 3,177,977 | 4/1965 | Deuschle et al. | 188/74 |
| 3,288,177 | 11/1966 | Coates | 188/74 |
| 3,660,895 | 5/1972 | West | 30/162 |
| 4,006,528 | 2/1977 | Katsuya . | |
| 4,088,210 | 5/1978 | Hoff | 192/17 |
| 4,152,833 | 5/1979 | Phillips | 83/DIG. 1 |
| 4,694,942 | 9/1987 | Ogano et al. | 192/13 |
| 4,807,724 | 2/1989 | Martin | 187/110 |
| 5,101,567 | 4/1992 | Cool | 83/DIG. 1 |
| 5,184,403 | 2/1993 | Schliemann | 83/169 |

FOREIGN PATENT DOCUMENTS

40-28526  12/1965  Japan .

*Primary Examiner*—Rinaldi I. Rada
*Assistant Examiner*—Kim Ngoc Tran
*Attorney, Agent, or Firm*—Jacobson, Price, Holman & Stern, PLLC

[57] ABSTRACT

A brake device disposed in the vicinity of a clutch drum has a leaf spring having a brake pad thereon which is brought into slidable contact with the clutch drum. A cam member and a compression coil spring which opposes a cam member with the leaf spring disposed therebetween are provided on a free end of the leaf spring. The cam member is rotated by a rotatable shaft together with a pinion gear which meshes with a rack formed on a stand. When a trimmer is placed on the ground, the stand is moved upwardly and the brake pad is brought into the braking position where the brake pad slidably contacts with the clutch drum. This braking position is released when an operation lever is operated by an operator.

16 Claims, 5 Drawing Sheets

PORTABLE TRIMMER EQUIPPED WITH BRAKE DEVICE FOR ROTATABLE CUTTER

BACKGROUND OF THE INVENTION

1. Field of the Invention

The present invention relates to a portable trimmer such as a hanging-type trimmer, a hedge trimmer, or the like wherein power generated by an internal combustion engine is generally transmitted through a centrifugal clutch to a rotatable cutter and, in particular, it relates to a portable trimmer which is equipped with a brake device to prevent unexpected operation of the rotatable cutter.

2. Description of the Related Art

In a portable trimmer such as a hanging type trimmer, a backpack type trimmer, a hedge trimmer, or the like, a driving mechanism which transmits the power generated by an internal combustion engine through a centrifugal clutch to a rotatable cutter is generally employed. In these types of portable trimmers, it is known to include a brake device in which the rotation of a clutch drum is forcibly restricted when, for example, the trimmer is placed on the ground or a flat floor. In this way start up of the trimmer is restricted or the trimming operation is temporarily stopped. The unexpected rotation of the rotatable cutter which is mechanically connected to the clutch drum is restricted by a band brake wound around the centrifugal clutch (see Japanese Patent Public Disclosure No. Sho 40-28526).

The afore-mentioned conventional brake device has a stand which is provided in the vicinity of the centrifugal clutch. The stand moves a predetermined stroke in an upward direction by its own weight of the internal combustion engine when the portable trimmer is placed on the ground. It also has an operating rod to which a free end of the band brake is connected. The operating rod engages with a pin fixed to the stand whereby it swings when the stand moves in the upward direction. It causes the band brake to be tightened to prevent the clutch drum from being rotated. This type of brake device is effective to prevent the unexpected rotation of the rotatable cutter while the trimmer is placed on the ground. The safety during the start-up time is effectively improved thereby.

However, in the afore-mentioned conventional brake device, the braking and releasing of the clutch drum relies on motions such as placing the portable trimmer on the ground or lifting it therefrom. Therefore, there is a possibility that the rotatable cutter may suddenly start rotating when the trimmer is lifted especially in the case of a cold start-up where a throttle is set to be wide open for relatively high engine revolution.

Therefore, it is an object of the present invention to provide a portable trimmer having a brake device which enhances and improves the conventional safety level of the rotatable cutter.

SUMMARY OF THE INVENTION

The object of the present invention described above is fulfilled by providing a portable trimmer comprising: a cutter; a brake device for the cutter; an internal combustion engine for driving the cutter; a centrifugal clutch for transmitting power generated by the internal combustion engine to a rotatable cutter, the centrifugal clutch having a clutch drum; a stand which is movable a predetermined stroke in a upward direction when the portable trimmer is placed on a plane; a cam member having a first cam surface and a second cam surface adjacent to the first cam surface and being rotatable about an axis between a braking rotational position and a brake releasing rotational position caused by an upward or downward movement of the stand; a leaf spring having a free end which slidably engages with a peripheral surface of the cam member; first pressing means for pressing the free end of the leaf spring against the cam surfaces of the cam member; and a friction element disposed opposite to the clutch drum of the centrifugal clutch and moved between a braking position at which the friction element slidably engages with the clutch drum and a brake releasing position at which the friction element is apart from the clutch drum caused by the movement of the free end of the leaf spring; the cam member taking the braking rotational position when the stand moves upwardly so that the first cam surface abuts with the free end of the leaf spring and taking the brake releasing rotational position when the stand moves downwardly so that the second cam surface abuts with the leaf spring, and whereby the friction element takes the brake releasing position.

According to the portable trimmer of the present invention, since the cam member and the leaf spring are disposed between the stand and the friction element, to control the friction element, an operation of the friction element can be initiated by an operator's intentional manipulation thereof in addition to an action of merely placing the trimming machine on a plane or lifting it up off the plane. The present invention prevents unexpected starting up of the rotatable cutter and it can be under the control of the operator's intentional operation. The present invention improves the safety level of the trimmer more than before. To achieve the above intentional operation by the operator, the stand may be, for example, pushed down or pulled out, or an operation lever may swing in response to the rotation of the cam.

Other features and advantages of the present invention will be clear from the description of the preferred embodiments herein-below.

DETAILED DESCRIPTION OF PREFERRED EMBODIMENTS

Figure 1:
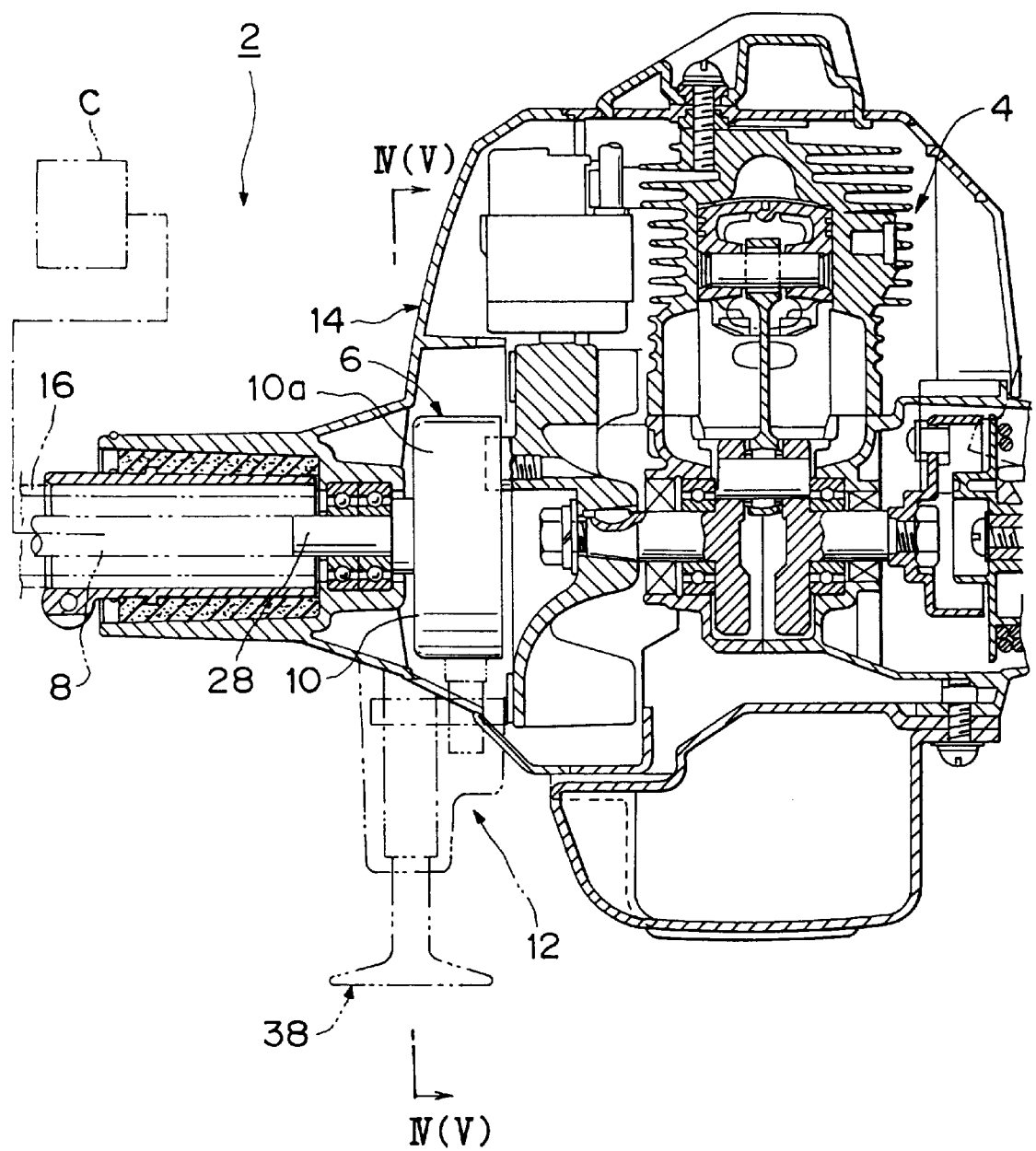
FIG. 1 is a partial cross-sectional view of a hanging type trimmer of the present embodiment.

Referring now to the attached drawings, preferable embodiments shall be described herein-after. As shown in FIG. 1, the hanging type trimmer 2 has a typical air cooled 2-stroke cycle internal combustion engine 4. The power generated by this internal combustion engine 4 is transmitted to a rotary blade cutting device C or a rotatable cutter through a centrifugal clutch 6 and a transmission shaft 8. A brake device 12 is disposed in the vicinity of a clutch drum 10 of the centrifugal clutch 6. The internal combustion engine 4 including the brake device 12 and the centrifugal clutch 6 is covered by a cover member 14. Further, the transmission shaft 8 is inserted into a cylindrical tube 16, and the cylindrical tube 16 is connected to the cover member 14 at one end and is connected to the rotary blade cutting device C at the other end.

Figure 2:
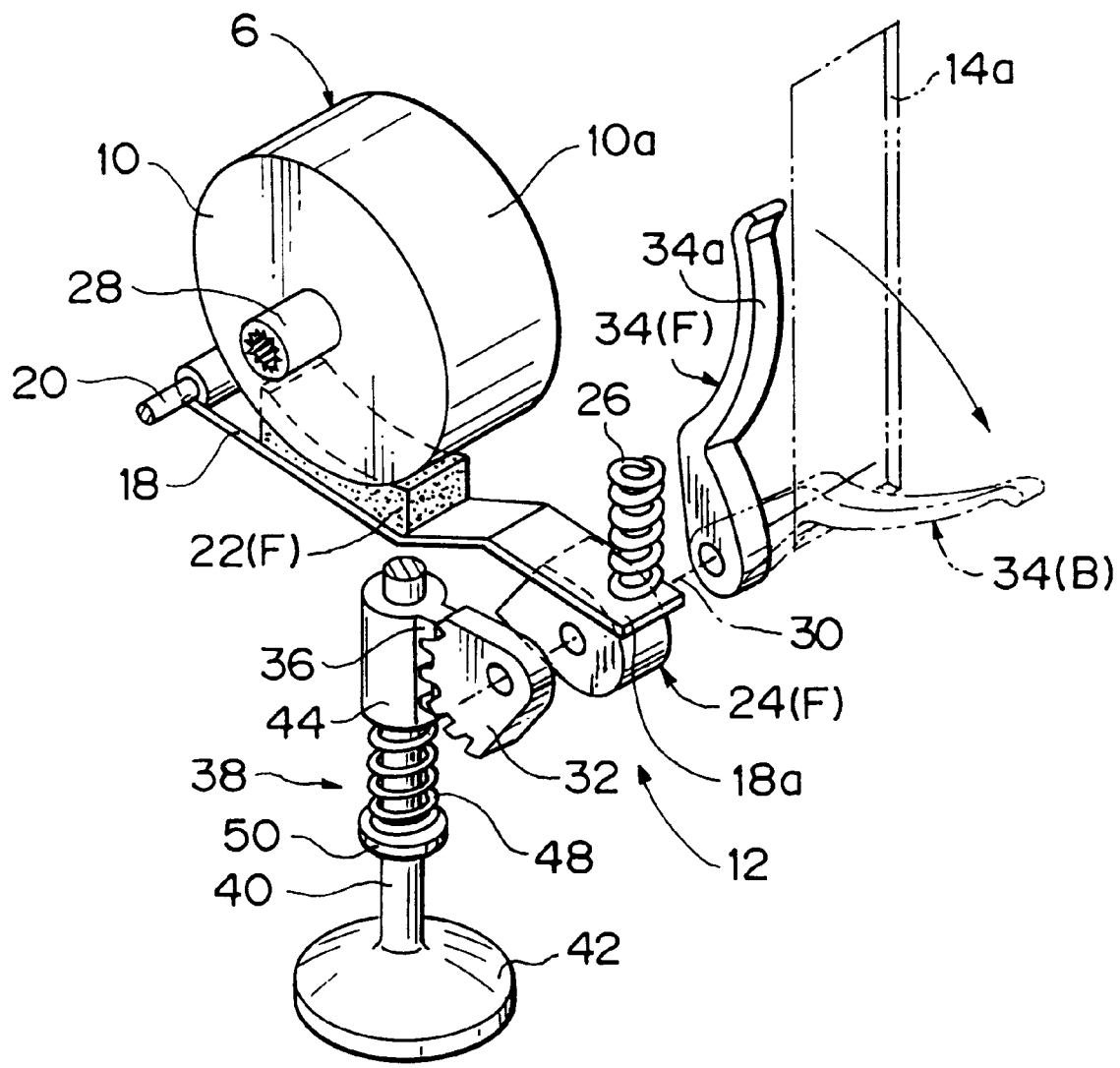
FIG. 2 is an exploded perspective view of a brake device integrated into a trimmer of the present embodiment.

As may be understood from FIG. 2, the brake device 12 has a leaf spring 18 disposed in the vicinity of the clutch drum 10. The leaf spring 18 is disposed under the clutch drum 10 so that one side surface thereof opposes a portion of an outer surface 10a of the clutch drum 10. One end of the leaf spring 18 is pivotably mounted on the cover member 14 by a pin 20. A brake pad 22 or a friction element is attached to the leaf spring 18 at a middle portion thereof in a longitudinal direction so as to oppose a portion of the outer surface 10a of the clutch drum 10. A cam member 24 is disposed in the vicinity of a lower side of the other end 18a of the leaf spring 18, i.e., a free end of the leaf spring 18.

A first compression coil spring is indicated at 26 in FIG. 2. It is provided above the cam member 24 opposing thereto and the leaf spring 18 is disposed therebetween. An upper end of the compression coil spring 26 is received by a spring retainer 29 which is fixed to the cover member 14 (see FIGS. 4 and 5) and a lower end thereof is held by an upper surface of the free end 18a of the leaf spring 18. Thus, the free end 18a of the leaf spring 18 is pressed against the cam member 24 by the compression coil spring 26 so that it is kept in contact therewith.

The cam member 24 is fixed to a rotatable shaft 30 having an axis disposed parallel to an output shaft 28 of the clutch drum 10 which engages with the transmission shaft 8 via splines. The rotatable shaft 30 is rotatably supported by the cover member 14. A sector-shaped pinion gear 32 and an operation lever 34 are also fixed to the rotatable shaft 30 next to and on either side of the cam member 24. A rack 36 which meshes with the pinion gear 32 is disposed on a stand 38 which moves upwardly with respect to the cover member 14 when the trimmer 2 is placed on a plane E of the ground or a floor. The stand 38 has a rod 40 of circular cross-section. A lower end of the rod 40 is shaped into a flange 42 so as to provide an enlarged contact surface. A sleeve 44 is fixed to a middle portion of the rod 40 with respect to the axial direction. Further, the rack 36 is disposed on an outer surface of the sleeve 44 so that its elongated axis is oriented in a longitudinal direction parallel to the longitudinal direction of the rod 40. The upper end portion of the rod 40 is slidably received in a guide tube 46 formed inside the cover member 14 (see FIGS. 4 and 5). The lower end surface 46a of the guide tube 46 (see FIG. 5) functions as a stopper to define an upper limit of an upward movement of the stand 38 to determine the stroke of the stand 38.

Figure 4:
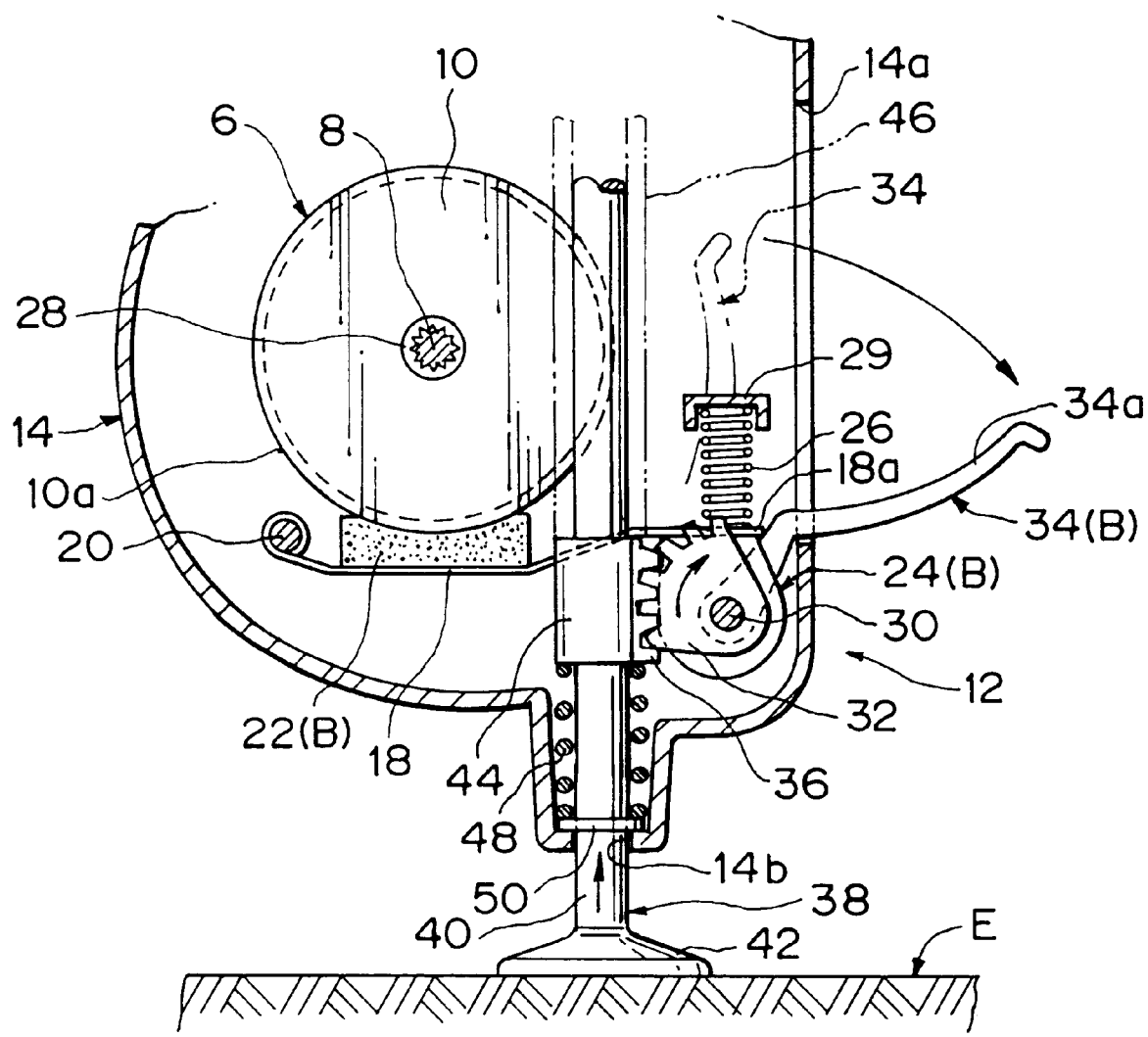
FIG. 4 is a cross-sectional view of the main part of the brake device of FIG. 2 illustrating its braking position.
Figure 5:
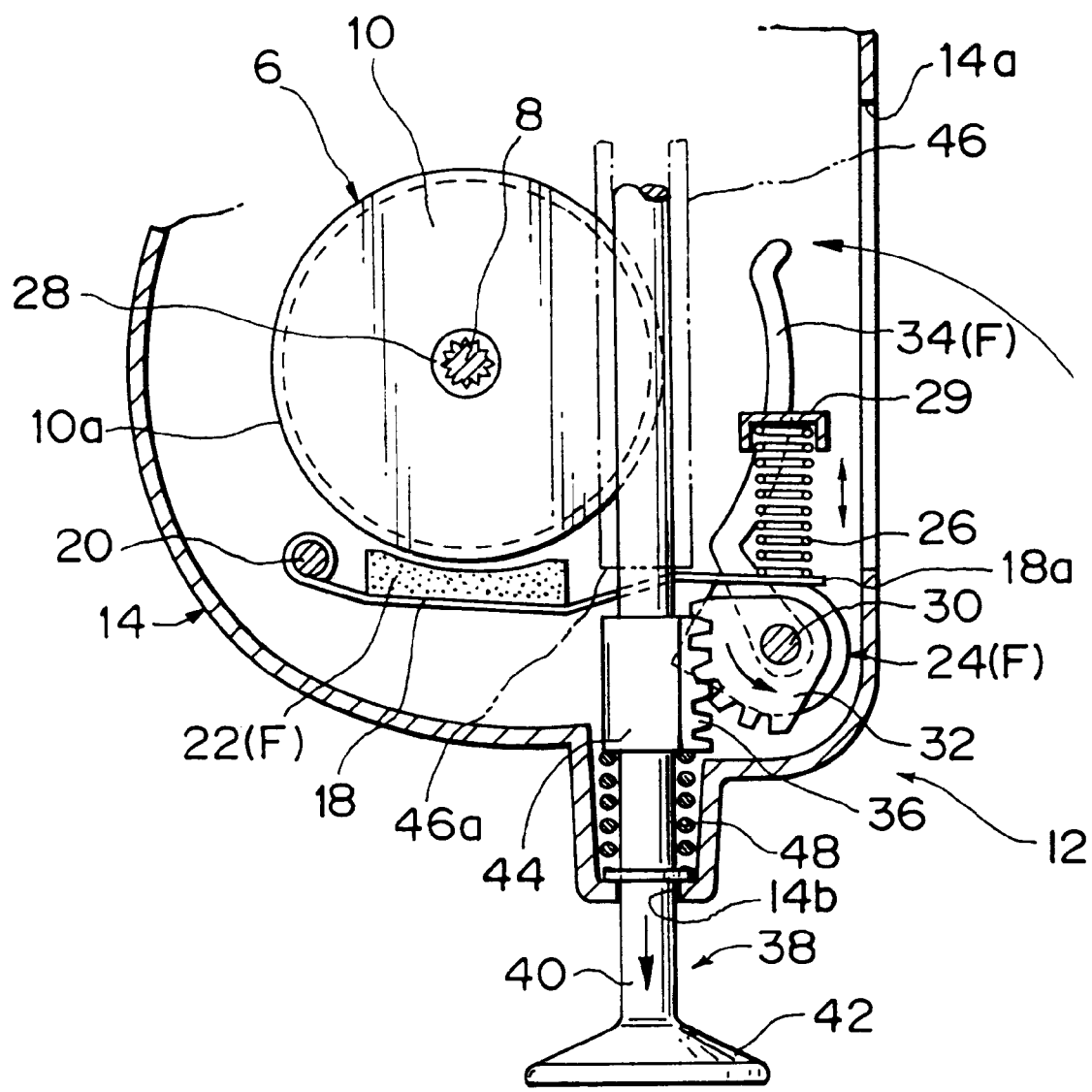
FIG. 5 is a cross-sectional view of the main part of the brake device corresponding to that of FIG. 4 illustrating its brake releasing position.

The stand 38, as shown in FIGS. 4 and 5, is provided in such a manner that its lower end portion protrudes downwardly through a bottom hole 14b of the cover member 14. This stand 38 is slightly pressed upwardly by a second compression coil spring 48 disposed between the lower end surface of the sleeve 44 and an inner peripheral edge of the bottom hole 14b of the cover member 14. Reference numeral 50 in FIGS. 2 and 4 represents a spring retaining ring for supporting a lower end of the compression coil spring 48. This spring retaining ring 50 is fitted to the rod 40 with some play.

The brake device 12 having the above-mentioned construction functions as follows. When the trimmer 2 is placed on the ground or the floor E, first, the stand 38 is moved upwardly to the upper limit position determined by the lower end surface 46a of the guide tube 46. The pinion 32 is rotated in a clockwise direction as shown in FIG. 4 by the rack 36 which moves upwardly together with the stand 38.

The rotation of the pinion 32 is transmitted to the cam member 24 and the operation lever 34 via the rotatable shaft 30, and these members 24 and 34 are turned in the clockwise direction as one unit whereby they are moved to a position depicted in FIG. 4. At the same time, the leaf spring 18 is moved to the position as depicted in FIG. 4 by the cam member 24 whereby the brake pad 22 is pressed against the outer surface 10a of the clutch drum 10. That is, FIG. 4 shows the clutch drum 10 to which a braking action is applied by the brake pad 22. For the purpose of easy explanation, the rotational position of the cam member 24 under the braking action shown in FIG. 4 is referred to as a "braking rotational position B" and the position of the brake pad is referred to as a "braking position B" hereinafter.

Further, as can be understood from FIG. 4, a portion of the cover member 14 close to the operation lever 34 is so shaped as to extend vertically when the trimmer 2 is placed on the ground E. Further, a vertically elongated window 14a is formed in a portion of the cover member 14 adjacent to the operation lever 34. The operation lever 34 is so designed that the operating portion 34a thereof is tilted to protrude out of the window 14a when the brake pad 22 is in the braking position B. For the convenience of explanation, the position of the operation lever 34 illustrated in FIG. 4 is referred to as the "braking position B" hereafter.

Generally, an operator starts the internal combustion engine 4 while the trimmer 2 is placed on the ground E as depicted in FIG. 4. In the trimmer 2 according to the present invention, even when the internal combustion engine 4 is started, the unexpected rotation of the rotatable cutter C can be prevented because the rotation of the clutch drum 10 is prevented by the brake pad 22. Similarly, when the trimmer 2 is placed on the ground E while the internal combustion engine 4 is running in the middle of trimming operation, the unexpected rotation of the rotatable cutter C can be prevented by the brake pad 22 which is moved to the braking position B by the mechanism described above.

Further, according to the brake device 12, even when the operator lifts the trimmer 2 to begin trimming operation after starting the internal combustion engine 4, the brake pad 22 is held in the braking position B. To release the braking action by the brake pad 22, it is required for the operator to shift the operation lever 34 to the position shown in FIG. 5. The operation lever 34 is designed to take an upright position inside the cover member 14 when the operator shifts the operation lever 34 to the brake releasing position F, as can be seen in FIG. 5. The cam member 24 and the pinion 32 are rotated in the counter-clockwise direction caused by the movement of the operation lever 34 whereby the stand 38 is moved downwardly. Due to the counter-clockwise rotation of the cam member 24, the leaf spring 18 takes the position as shown in FIG. 5 and the brake pad 22 moves away from the outer surface 10a of the clutch drum 10 and takes the brake releasing position F.

That is, FIG. 5 shows the brake in a released position where the brake pad 22 is spaced from the outer surface 10a of the clutch drum 10. For the convenience of the explanation, the braking position of the stand 38, the rotational position of the cam member 24, and the position of the brake pad 22 as shown in FIG. 5 are referred to as a "brake releasing position F", a "brake releasing rotational position F", and a "brake releasing position F", respectively. Further, the position of the operation lever 34 shown in the FIG. 5 is hereafter referred to as a "brake releasing position F". By the mechanism described above, the centrifugal clutch 6 is allowed to transmit the power from the internal combustion engine 4 to the rotatable cutter C.

Figure 3:
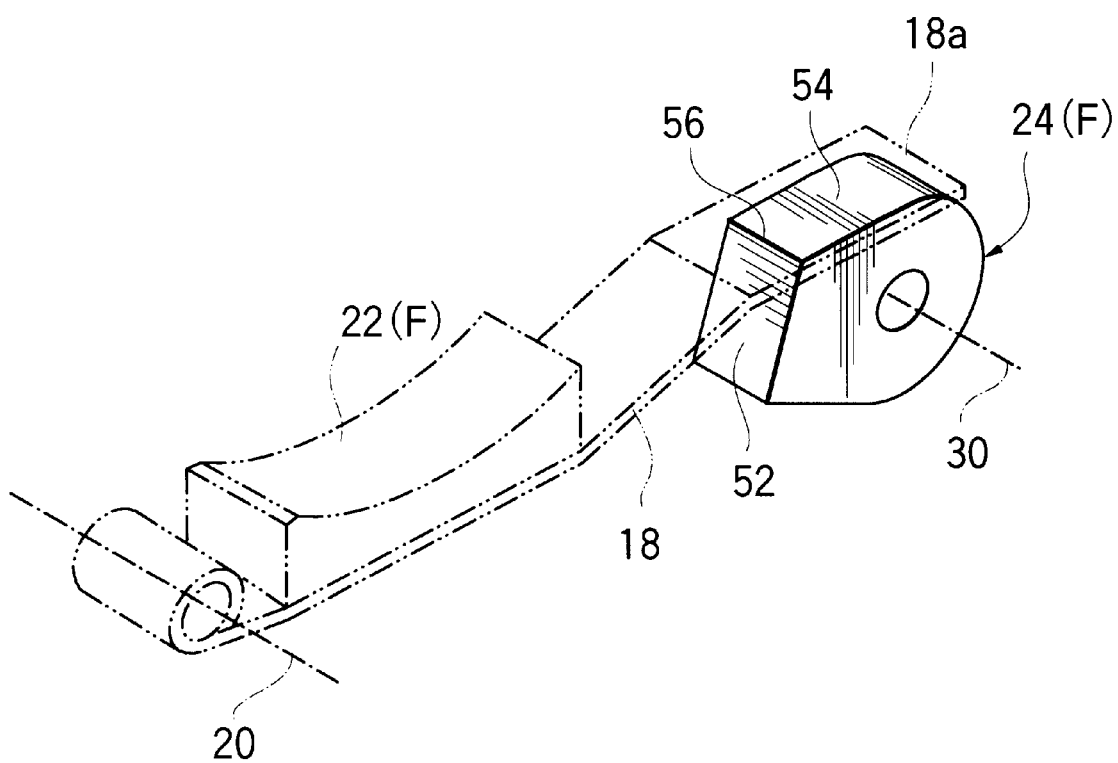
FIG. 3 is a perspective view illustrating some elements taken out of the brake device of FIG. 2.

The swing angle of the operation lever 34 between the brake releasing position F and the braking position B is set to be about 60 degrees in this embodiment. This angle can be selectively changed by a cam surface formed on the cam member 24. On the cam member 24, as shown in FIG. 3, a first cam surface 52 and a second cam surface 54 are formed adjacent to each other. The first and second cam surfaces 52, 54 are flat, and the border portion 56 therebetween is shaped to be a corner in order to be held in the rotated angular position. The distances between the first cam surface 52 and the second cam surface 54 from the rotatable shaft 30 are different from each other. The distance between the first cam surface 52 and the rotatable shaft 30 is set to be greater than that between the second cam surface 54 and the rotatable shaft 30. When the cam member 24 is rotated to the braking rotational position B, the first cam surface 52 makes contact with the leaf spring 18 to push it up. When the cam member 24 is rotated to the brake releasing rotational position F, the second cam surface 54 lightly abuts with the leaf spring 18 which is elastically restored to the original position.

As can be understood from the afore-mentioned description, in accordance with the trimmer 2, the releasing of the brake device 12 can be initiated by the operator's intentional action, namely, the operation of the operation lever 34. In other words, in accordance with the trimmer 2, for example, the braking device 12 is automatically set before its start-up when the trimmer 2 is placed on the ground E. However, the releasing of the braking action is accomplished by the intentional operation of the operator. Further, the centrifugal clutch 6 may be moved to the braking position by operating the operation lever 34 from the "brake releasing position F" to the "brake working position B" as required during the trimming operation. To accomplish such operations, the operator must intentionally pull out the operation lever 34 through the window 14a formed in the cover member 14. In this way erroneous actions including unnecessary setting or releasing of the braking device are avoided.

Further, the rotation of the cam member 24 can be selectively positioned to either the braking rotational position B or the brake releasing rotational position F due to the configurations of the first flat cam surface 52, the second flat cam surface 54, and the angular border portion 56 therebetween. This rotational positioning of the cam member 24 also allows the operation lever 34 to selectively take either the brake releasing rotational position F or the brake working position B. Further, the pressing force by the second compression coil spring 48 acting on the stand 38 can effectively prevent the stand 38 from rattling during operation. In addition, the flange 42 formed at the lower end of the stand 38 by providing a wide contact area prevents the stand 38 from penetrating into the ground E.

Though a preferable embodiment of the present invention has been described as above, it is to be understood that the present invention is not restricted to that and may include such modified embodiments as described below.

(1) Though, in the trimmer 2 described above, the stand 38 is automatically moved to the raised position by the weight of the trimmer 2 when the trimmer 2 is simply placed on the ground or floor E. However, the stand 38 may be constructed in such a way that it does not move to the raised position when the trimmer 2 is simply placed on the ground E but is moved thereto only when the operator intentionally applies a downward force greater than a predetermined value to the cover member 14. This can be accomplished, for example, by properly selecting the spring force of the first compression coil spring 26.

(2) Though, in the trimmer 2 described above, the brake pad 22 has been employed as the friction element of the brake device 12, a brake band as disclosed in above-mentioned Japanese Patent Publication No. Sho 40-28528 may be employed instead of this type of the brake pad. In the case where such a brake band is employed, the free end of the brake band may be, for example, connected to the free end 18a of the leaf spring 18.

(3) The present invention shall not be limited to the hanging type trimmer 2 as described above and it may be applied to other types of portable trimmers, for example, a backpack-type trimmer, a hedge trimmer, or the like employing a centrifugal clutch.

What is claimed is:

1. A portable trimmer comprising:
   a rotatable cutter;
   a brake device for breaking said rotatable cutter;
   an engine for driving said rotatable cutter;
   a centrifugal clutch for transmitting power generated by said engine to said rotatable cutter, said centrifugal clutch having a clutch drum;
   a stand which is movable a predetermined stroke in an upward direction when said portable trimmer is placed on a generally flat surface;
   a cam member having a first cam surface and a second cam surface adjacent to said first cam member surface, said cam being rotatable about an axis between a braking rotational position and a brake releasing rotational position caused by an upward or downward movement of said stand;
   a leaf spring having a free end which slidably engages with a peripheral surface of said cam member;
   first pressing means for pressing said free end of said leaf spring against said cam surfaces of said cam member; and
   a friction element, disposed opposite to said clutch drum of said centrifugal clutch, said friction element having a friction element movement between (A) a braking position at which said friction element slidably engages with said clutch drum and (B) a brake releasing position at which said friction element is apart from said clutch drum, said friction element movement caused by the movement of said free end of said leaf spring;
   wherein:
   said cam member takes said braking rotational position when said stand moves upwardly so that said first cam surface abuts with said free end of said leaf spring; and
   said cam member takes said brake releasing rotational position when said stand moves downwardly so that said second cam surface abuts with said leaf spring, whereby said friction element takes said brake releasing position.

2. A portable trimmer in accordance with claim 1, wherein said friction element has a brake pad which slidably engages with a portion of an outer surface of said clutch drum and is fixed to a middle portion of said leaf spring.

3. A portable trimmer in accordance with claim 2, wherein said first cam surface and said second cam surface are flat and a border portion between said first cam surface and said second cam surface is formed in the shape of a corner.

4. A portable trimmer in accordance with claim 2, further comprising an operation lever which is connected to said cam member and swings in response to the rotation of said cam member.

5. A portable trimmer in accordance with claim 4, wherein said first cam surface and said second cam surface are flat and a border portion between said first cam surface and said second cam surface is formed in the shape of a corner.

6. A portable trimmer in accordance with claim 5, further comprising a cover member for housing said internal combustion engine, said centrifugal clutch, said cam member, said leaf spring, and said operation lever, and wherein said cover member has a window through which said operation lever can project.

7. A portable trimmer in accordance with claim 6, in which said operation lever is housed inside said cover member when said friction element takes said brake releasing position and extends out through said window when said friction element takes said braking position.

8. A portable trimmer in accordance with claim 4, further comprising a cover member for housing said internal combustion engine, said centrifugal clutch, said cam member, said leaf spring, and said operation lever, and wherein said cover member has a window through which said operation lever can project.

9. A portable trimmer in accordance with claim 8, in which said operation lever is housed inside said cover member when said friction element takes said brake releasing position and extends out through said window when said friction element takes said braking position.

10. A portable trimmer in accordance with claim 1, further comprising an operation lever which is connected to said cam member and swings in response to the rotation of said cam member.

11. A portable trimmer in accordance with claim 10, further comprising a cover member for housing said internal combustion engine, said centrifugal clutch, said cam member, said leaf spring, and said operation lever, and wherein said cover member has a window through which said operation lever can project.

12. A portable trimmer in accordance with claim 11, in which said operation lever is housed inside said cover member when said friction element takes said brake releasing position and extends out through said window when said friction element takes said braking position.

13. A portable trimmer in accordance with claim 10, said stand further having a second thrust means for pressing the stand in a direction which causes said stand to move downwardly.

14. A portable trimmer in accordance with claim 13, further comprising a cover member for housing said internal combustion engine, said centrifugal clutch, said cam member, said leaf spring, and said operation lever, and wherein said cover member has a window through which said operation lever can be project out of.

15. A portable trimmer in accordance with claim 14, in which said operation lever is housed inside said cover member when said friction element takes said brake releasing position and extends out through said window when said friction element takes said braking position.

16. A portable trimmer in accordance with claim 1, wherein said first cam surface and said second cam surface are flat and a border portion between said first cam surface and said second cam surface is formed in the shape of a corner.

* * * * *